Nov. 7, 1961 B. VOSSEN 3,007,636

CARD READER

Filed Dec. 7, 1956 4 Sheets-Sheet 1

INVENTOR
BERND VOSSEN

BY [signature]

ATTORNEY

INVENTOR
BERND VOSSEN

BY [signature]

ATTORNEY

Nov. 7, 1961 B. VOSSEN 3,007,636

CARD READER

Filed Dec. 7, 1956 4 Sheets-Sheet 3

INVENTOR
BERND VOSSEN

BY [signature]

ATTORNEY

Nov. 7, 1961 B. VOSSEN 3,007,636

CARD READER

Filed Dec. 7, 1956 4 Sheets-Sheet 4

INVENTOR.
BERND VOSSEN
BY Hyman Hurvitz
atty

United States Patent Office 3,007,636 Patented Nov. 7, 1961

3,007,636

CARD READER

Bernd Vossen, Arlington, Va., assignor to Melpar, Inc., Falls Church, Va., a corporation of New York Filed Dec. 7, 1956, Ser. No. 627,036
18 Claims. (Cl. 235—61.11)

The present invention relates generally to machines for reading information recorded on punched record media and more particularly to a reliable and inexpensive punched card reading mechanism for translating information recorded on punched cards into distinct groups of control signals for effecting operation of associated equipment and for automatically sequencing the card reading mechanism.

There are presently available a number of punched card readers for producing electrical control voltages in accordance with information recorded on punched cards in the form of perforations located at predetermined discrete information areas on the card. Designers in this field have been primarily concerned with increasing the speed of operation of such reading mechanisms at the expense of increased cost and complexity of the apparatus. There are, however, a number of applications for punched card readers which do not require high reading speeds and wherein the cost and complexity of high speed reading mechanism are unwarranted. Applications wherein relatively slow speed punched card reading mechanisms may be employed are the control of automatic machine tools, automatic assembly machines and related apparatus. It has been the practice in the past to utilize available high speed card reading mechanisms in such applications and to synchronize the high speed reader with the controlled machinery so as to operate the reading mechanism at a speed far below its capability but in synchronism with the apparatus being controlled. From an economic point of view the utilization of an expensive high speed reader in conjunction with a slow speed mechanism to be controlled is undesirable since the user is paying for high speed performance which he does not utilize.

Another disadvantage of the prior art high speed card reading mechanisms is that timing mechanisms are normally employed to recycle the reading mechanism in order to obtain repetitive interrogation of a single card, thereby further increasing the complexity and cost of the equipment. Also, the timing controls of the prior art machines are not infallible and consequently the card reading mechanism and controlled mechanism fall out of synchronization, damaging the product, the equipment and/or the punched card.

It is, therefore, an object of the present invention to provide a self-contained inexpensive relatively slow speed punched card reading mechanism.

It is another object of the present invention to provide a punched card reading mechanism controlled by information recorded on the punched card.

It is another object of the present invention to provide a punched card reading mechanism which is self-contained and may be considered an accessory to the apparatus to be controlled and may work in conjunction with a manually controlled programer.

In accordance with the present invention the basic card reader component is a modified electric typewriter chassis. The electric typewriter is modified by the removal of the key bars, the type bars and the platen while the electric motor and drive mechanism, the carriage advance and carriage return mechanisms and the shift mechanisms are retained.

A punch card holder is mounted on the carriage and a punch card sensing mechanism is mounted for vertical reciprocation by the shift mechanism of the modified typewriter into and out of a card sensing position. The carriage advance mechanism is related to the position of the sensing mechanism such that upon each advance of the carriage a new group of perforated areas of the card is presented to the sensing mechanism. The carriage advance mechanism and the shift mechanism are physically interrelated so that after each carriage advance the shift mechanism is actuated to move the sensing mechanism into a reading position. In consequence, as each new plurality of discrete information areas is presented to the sensing mechanism, the areas are interrogated and a new cycle of carriage advance and sensing may take place.

The sensing mechanism of the card reader comprises a plurality of sensing pins slidably carried for selective vertical movement between two terminal positions in a bearing block mounted on the shift mechanism. The discrete information areas on the punched card are arranged in rows and columns extending respectively parallel to and perpendicular to direction of movement of the carriage and the sensing pins are arranged parallel to the columns of perforations. Upon the sensing mechanism being raised to a sensing position as the result of a shift operation following a carriage advance, the sensing pins aligned with apertured areas of the card pass through the card and their position remains unchanged. Those pins contacting unperforated areas of the punched card are displaced from their original position and actuate associated switches which are adapted to effect control operations as subsequently described. Upon the shift mechanism being returned to its original position the pins which have been deflected by unperforated areas of the card are reset to their initial position so that further sensing operations may be performed.

The switches actuated by the various sensing mechanisms are arranged in a control circuit such that predetermined switches are employed for the control of the card reading mechanism while others of the switches are employed to effect the production of signals utilized to control the apparatus associated with the card reading mechanism for control thereby. Each of the rows of perforated areas allotted to control of the card reader effects control of a different function of the machine, while information recorded in the remaining rows of the card is normally set aside for control of the apparatus associated with the punched card reading mechanism.

The apparatus of the present invention is capable of being employed to control any apparatus capable of performing its operations in response to electrical control voltages. For the purpose of explanation, however, the apparatus of the present invention is described as controlling an automatic assembly machine such as is disclosed and claimed in a co-pending application for United States patent, filed in the name of Bernd Vossen, Serial No. 577,328, filed April 10, 1956, for Wafer Feed and Insertion Mechanisms, and assigned to the assignee of the present application.

The invention of the aforesaid co-pending application relates to an automatic machine for fabricating electronic subassemblies comprising a wafer having electrical components stapled thereto. A wafer in the form of a thin sheet of insulating material is provided with a plurality of aperture pairs for insertion of terminal leads of standard electrical components therein. The apertured pairs on the wafer are located at predetermined locations for all wafers employed in the system and a predetermined number of component positions is thus rendered available. A wafer positioning mechanism in the form of a pneumatic servo system is available for selectively positioning the wafer so that any desired pair of apertures may be positioned under a stapling head for insertion of a component. Each wafer is provided with printed circuitry on one of its sides and the components are secured to the other side, the wire terminals of the components passing through the apertures being bent into stapled relation to the wafer and into intimate contact with the printed circuitry. In order to provide pre-selected components to the assembly or stapling position, components of identical type are stacked in separate gravity feed hoppers. The separate components may be delivered to a conveyor by electro-magnetically actuated hopper gates, each of which is associated with one hopper and designated to drop one component when briefly electrically energized. Each component, as it is dropped, is conveyed to a stapling position where it is stapled by the stapling head to a wafer previously positioned. After a stapling operation is completed, the wafer is repositioned and a new component is dropped for stapling to the wafer.

The moving parts of the machine are operated by pneumatic-servos, electrically controlled. In particular the wafers are positioned in two coordinate directions by a pair of servos acting at right angles relative to one another, and in accordance with a specific embodiment of the invention of the aforesaid patent application, the wafer is positionable in two positions in one coordinate direction and in seven distinct positions in the other coordiante direction. This enables complete positioning in two coordinate directions on a quantized basis so that any preselected pair of wafer apertures may be placed in component insertion positions by selecting one servo control solenoid valve for each position in one coordinate direction, and by appropriately controlling a further servo motor to establish position in a second coordinate direction. Wafers are fed in succession from a remote hopper to the stapling and soldering position by means of a chain conveyor which is maintained continually full. A wafer transition mechanism abstracts the wafers one by one from the chain conveyor and places them in the wafer positioning carriage in sequence. The latter is, in turn, controlled by the two coordinate servo systems described above. The selections of components and a wafer position in the system above described may be controlled either in response to selectively actuatable push-button switches or by means of punched cards and it is the purpose of the present invention to provide a punched card reading mechanism which may be employed in conjunction with the apparatus of the aforesaid co-pending application. Accordingly, if the apparatus of the present invention is to be employed to control the aforesaid assembly machine, the punched cards must contain coordinated information concerning wafer position, of component type corresponding with each wafer position, and information calling for the insertion and subsequent removal of a wafer, and the card reading apparatus must be capable of converting the information on the cards into signals appropriate for the control of the assembly machine. A given card contains control information for a single complete subassembly and cards may be punched for any combination of component types and wafer locations which are within the capability of the assembly machine, as well as for the order of assembly of the selected components on the wafer.

While the particular function of the automatic assembly machine may be controlled by information recorded on punched cards, the time interval required for each function of the machine may vary considerably and, therefore, the cycling of the system is preferably under the control of the automatic assembly machine. More specifically, the card reading mechanism of the present invention is disabled after reading the information contained in each column of the punched card and remains disabled until a signal is generated by the automatic assembly machine, indicating that the previously designated function has been completed. Upon receipt of this signal the card reading mechanism is rendered operative to read another column of information on the card after which it must again wait for a signal from the assembly machine indicating that the operation has been completed. This feature of the card reading mechanism of the present invention, however, is not essential since internally generated signals may be employed where the apparatus is utilized with equipment that performs each and every operation within a predetermined time interval.

When the apparatus of the present invention is employed with the automatic assembly machine of the aforesaid co-pending application, the information recorded on the cards for control of the assembly machine must sequentially and successively call for wafer insertion, define the wafer position, select the components to be inserted in the wafer, cycle a wafer ejection and again call for a new wafer insertion. The card must also provide information for carriage advance and carriage return if assembly of the same wafer configuration or set of wafer configurations is to be repeated, or information calling for disablement of the card reading mechanism if only a single wafer or set of wafers is to be fabricated.

It is, accordingly, a broad object of the present invention to provide an automatic card reading mechanism which is controlled and cycled by information recorded on the punched card.

It is another object of the present invention to provide a card reading mechanism employing a modified electric typewriter chassis wherein the information recorded on the card in association with the control circuitry of the apparatus provides for sequential and successive presentation of the columns of information on the record to a record sensing mechanism and further provides for a carriage return function so as to repeat the interrogation of information on the card.

It is another object of the present invention to provide a card reading mechanism wherein the information recorded on the record medium in conjunction with appropriate control circuitry controls both the card reading mechanism and a machine for performing an independent useful operation.

It is another object of the present invention to provide a novel card sensing mechanism which senses the apertured areas of a card in response to movement of the sensing mechanism toward the record medium.

The above and still further objects, features and advantages of the present invention will become apparent upon consideration of the following detailed description of one specific embodiment thereof, especially when taken in conjunction with the accompanying drawings, wherein.

Figure 1:
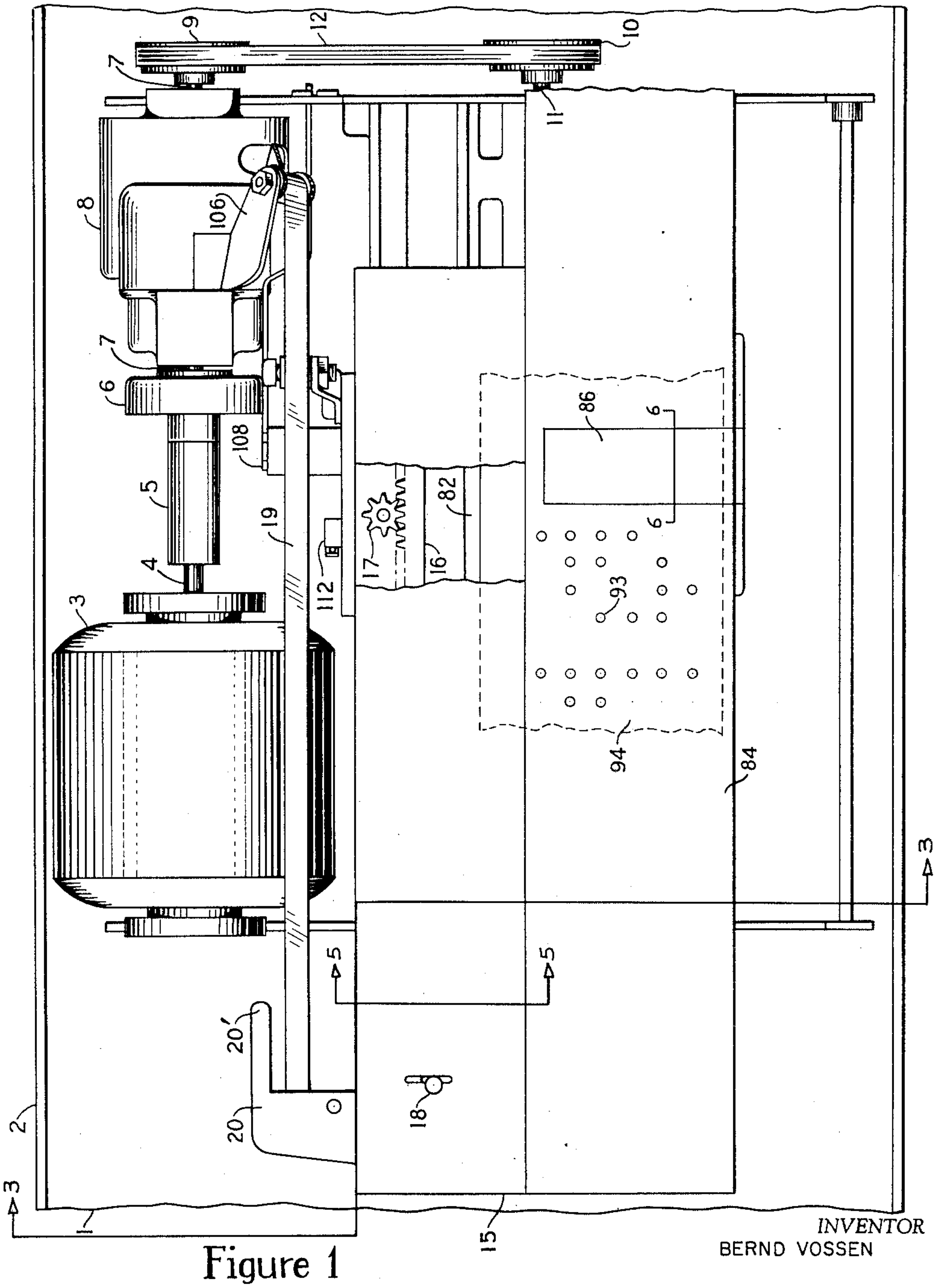
FIGURE 1 is a top view of a physical embodiment of the card reading apparatus of the present invention.
Figure 2:
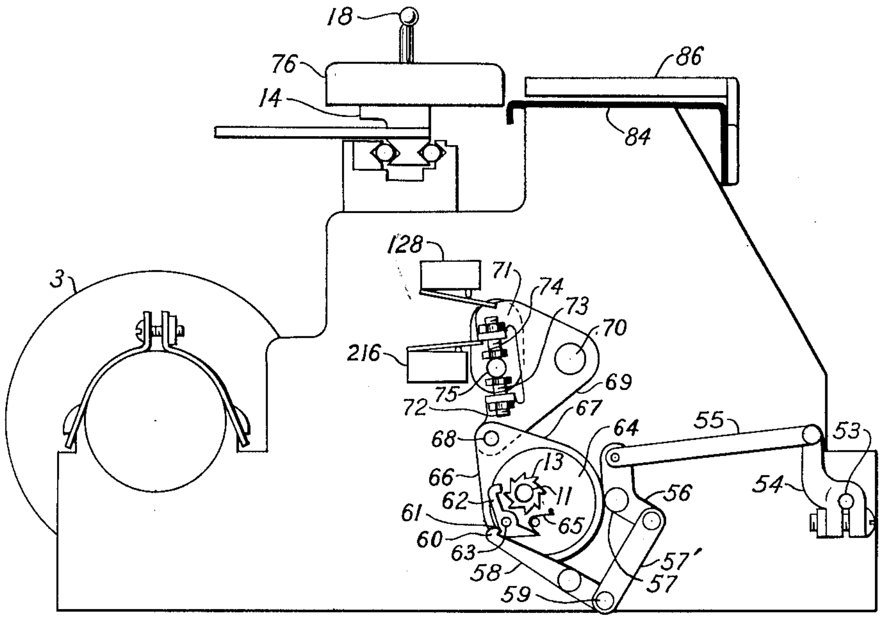
FIGURE 2 is a view in elevation of the left side of the apparatus as viewed in FIGURE 1.
Figure 3:
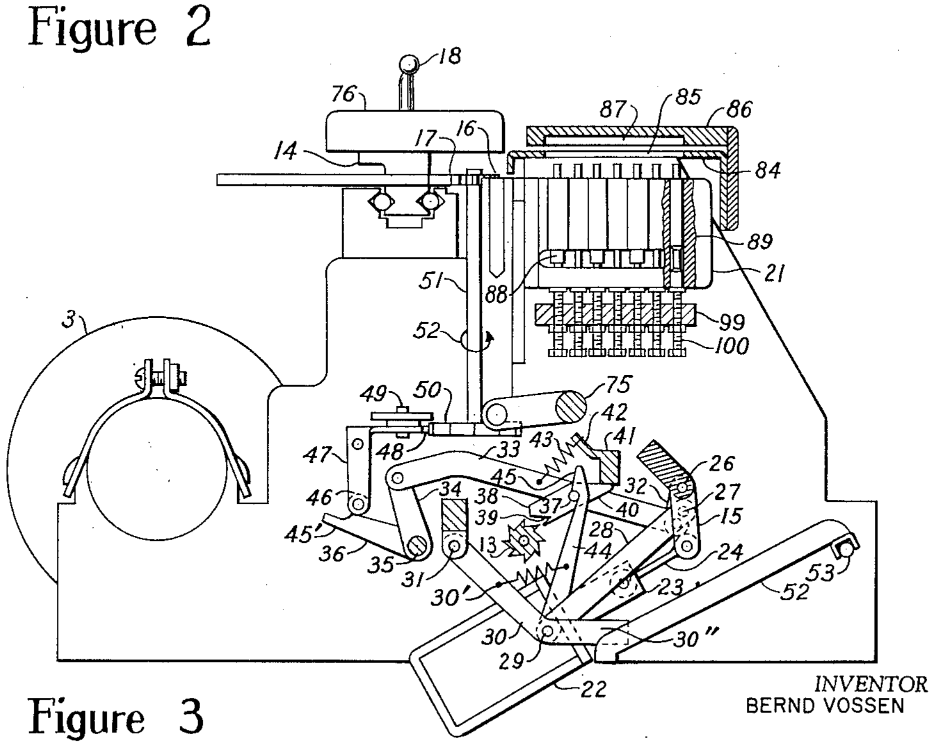
FIGURE 3 is a view taken along on line 3—3 of FIGURE 1.
Figure 4:
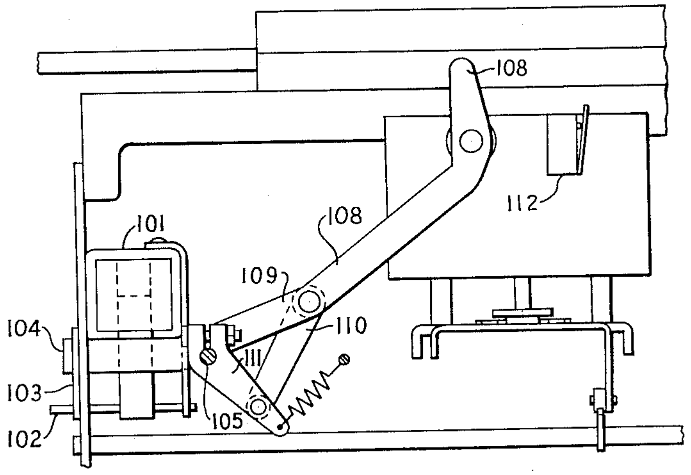
FIGURE 4 is a view of the carriage return control mechanism of the card reader of the present invention.

Referring specifically to FIGURES 1–3 of the accompanying drawings, there is illustrated a top view of the punched card reading mechanism, generally designated by the reference numeral 1, which employs a modified electric typewriter chassis. The reading mechanism 1 has a base 2 normally supported on legs, not illustrated, and a conventional electric typewriter drive mechanism including an electric motor 3, which when energized drives an output shaft 4. The shaft 4 is connected through a flexible coupling 5 to a slip clutch 6, the clutch 6 driving a shaft 7 which passes through the housing of a ratchet clutch 8 and drives a pulley 9 located on the right side of the card reading mechanism as viewed in FIGURE 1. The pulley 9 is coupled via an endless belt 12 to a further pulley 10 mounted on a shaft 11, which passes through the width of the machine and is conventionally journaled in bearings, not illustrated. The shaft 11 carries an elongated ratchet wheel 13 which conventionally supplies power for actuating the type bars, the spacing mechanism and the shift mechanism of a conventional electric typewriter.

In accordance with the present invention, the keys and the type bars of a commercial electric typewriter are removed and the carriage spacing and shifting mechanisms are interrelated so that a shift operation takes place after each spacing operation. The machine 1 includes a conventional carriage assembly 14, the platen of the conventional typewriter having been removed and replaced by a punch card holder 15, illustrated in detail in and described subsequently by reference to FIGURE 5 of the accompanying drawings.

Figure 7:
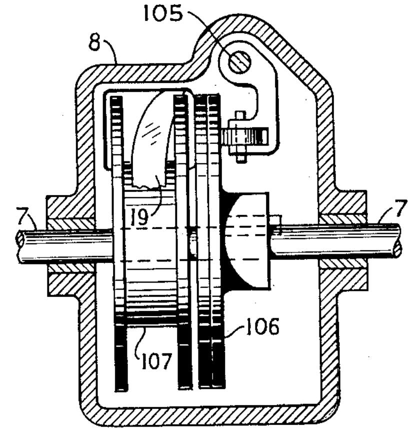
FIGURE 7 is a cross sectional view of the ratchet clutch for controlling carriage return.

The carriage 14 carries a conventional rack gear 16 which co-acts with a pinion 17 to effect movement of the carriage from the right to the left as viewed in FIGURE 1 of the accompanying drawings. A lever 18 is employed to rock the rack gear 16 out of an engagement with the pinion 17 so that the carriage may be returned to the far right position, the mechanism including the rack gear 16 and the lever 18 for pivoting the rack gear being conventional in electric typewriters. The carriage 14 is biased for movement from the right to the left, as viewed in FIGURE 1, by means of a conventional spring biased belt, not illustrated in the figures of the accompanying drawings. The carriage is returned to the far right position by means of a belt 19, having one end attached to a stop 20 which is secured to the left end of the carriage 14, as viewed in FIGURE 1. The belt 19 is adapted to return the carriage to the right hand position upon actuation of the clutch 8, the belt 19 being wound on a pulley 107 (illustrated in FIGURE 7) which is coupled to the shaft 7 by means of the clutch 8.

In the conventional electric typewriter, the shift mechanism is employed to affect the typing of capital letters rather than small letters, which are normally typed unless the shift mechanism is actuated. To affect the typing of capital letters the entire type bar bed is dropped or lowered in response to actuation of the shift key so that the upper portion of each letter bar, which carries the capital letter, strikes the platen. In accordance with the present invention the normal or home position of the type bar bed is reversed so that it is normally in the lower position and when it is desired to read a punched card the bed is raised. The type bars of the typewriter, as previously indicated, are removed and in place thereof there is provided a card sensing mechanism 21, which is to be raised into a card reading position at the end of each spacing operation of the machine. Consequently, the spacing mechanism and the shifting mechanism for the card reading members must be interrelated and actuated by a common mechanism, a solenoid 22, illustrated in FIGURE 3 of the accompanying drawings, being employed for this purpose.

The solenoid 22 includes an armature 23 connected by means of a straight bar 24 to the lower end of a link 25. The upper end of the link 25 is pivoted on a fixed shaft 26 and intermediate its ends is pivoted by means of a pin 27 to the upper end of a link 28. The link 28 extends downwardly at approximately a 45° angle, its lower end being pivoted by means of a pin 29 to the elbow of a bent link 30 having two straight arms 30′ and 30″ intersecting at about a 135° angle. The arm 30′ of link 30 extends upwardly and to the left, as viewed in the FIGURE 3, from the pivot pin 29 at approximately 45° and is pivotally connected at its upper end to a pivot pin 31. The arm 30″ of link 30 extends horizontally to the right from pivot pin 29, terminating approximately under the point of connection of the bar 24 to the plunger 23. A link 32 is pivotally secured to the shaft 26 and extends downwardly a distance somewhat less than does the link 25. Another link 33 has one end pivotally secured to the lower end of the link 32 and extends to the left and upwardly at an acute angle to the link 32 to a position just approximately above the pin 31, the link 33 being bent at this point and extending downwardly and to the left for a short distance, terminating in an end which is pivotally secured to a further link 34. The link 34 extends downwardly and to the right from its point of connection to the link 33, the lower end of the link 34 being secured to a rotatable shaft 35.

Also secured to the shaft 35 is a link 36 which extends to the left and upwardly from the shaft 35 and terminates in an end having a notch 45′ formed in its upper surface. Intermediate the right hand end of the link 33 and the bend therein, there is provided a stud 37 on which is rotatably secured a pawl 38 having a downwardly directed toothed end 39 adapted to engage the teeth on the ratchet wheel 13. Normally, the pawl 38 is positioned above and somewhat to the right of the ratchet 13, and extends downwardly from the pin 37 at an angle of approximately 30 degrees with the horizontal. The pawl 38 extends above and to the right of the pin 37, having a horizontal surface 40 which engages a horizontal surface of a guide member 41. The guide member 41 further includes an arm 42 extending upwardly and to the left, which is adapted to engage one end of a spring 43 which extends downwardly and to the left and engages the link 33.

A further link 44 has a hook end 45 which engages the pin 37, the link 44 extending downwardly and somewhat to the left and is pivoted on the pin 29, which is secured to the link 30. The notch 45′ in the end of the link 36 is adapted to engage a roller 46 on a bell crank 47, which carries on the far end thereof a pawl 48, the bell crank 47 being rotatable about a shaft 49 having a vertical axis as viewed in FIGURE 3. The pawl 48 is adapted to engage a ratchet wheel 50 secured on the lower end of the vertically extending rotatable shaft 51. The previously described pinion 17 is carried on the upper end of the shaft 51, the pinion 17 engaging the rack gear 16 to effect movement of the carriage 14.

Upon energization of the solenoid 22, the plunger 23 is retracted, producing clockwise rotation of the link 25. Clockwise rotation of the link 25 produces a movement of the link 28 downwardly and to the left thereby causing the link 30 to rotate clockwise about the pin 31. Clockwise rotation of the link 30 pulls down on the link 44 to effect counterclockwise rotation of the link 33. Counterclockwise rotation of the link 33 causes the teeth 39 of the pawl 38 to engage the ratchet wheel 13. Upon engagement of the pawl 38 with the ratchet wheel 13, the link 33 is rapidly moved to the right as viewed in FIGURE 3 to thereby produce a clockwise rotation of the links 34 and 36. Rotation of the link 36 effects rotation of the bell crank 47 which steps the ratchet one step in the direction indicated by the arrow 52′. The rotation of the shaft 51 effects rotation of the pinion 17 which, due to its engagement with the rack 16, moves the carriage 14 one space toward the left as viewed in FIGURE 1 of the accompanying drawings.

The movement imparted to the pawl 38 by the ratchet 13, coupled with the continued downward movement of the link 30 as a result of continued movement of the plunger 23 into the core of the solenoid 22, causes the pawl 38 to be moved out of the path of ratchet 13 and to swing to the right thereof so that no further movement of the carriage 14 is effected during continued operation of the linkages. Upon further movement of the plunger 23, the horizontal arm 30″ of the link 30 engages the left hand end, as viewed in FIGURE 3, of a link 52. The right hand end of the link 52 is secured to a rotatable shaft 53 which is rotated counterclockwise when the arm 30″ engages the link 52 and rotates it counterclockwise.

Referring now specifically to FIGURE 2 of the accompanying drawings, the shaft 53 is coupled to an upwardly extending arm 54 having pivotally secured thereto one end of a link 55. The link 55 extends approximately horizontally to the left and has its other end pivotally secured to an upper vertical arm of a bell crank 56 pivoted about a shaft 57. The lower end of the bell crank 56 is pivotally secured to a link 57' extending downwardly and to the left from the lower end of the bell crank 56. The lower end of the link 57' is pivoted to the lower right end of a hooked arm 58 extending to the left and upwardly from this point of connection. The hook arm 58 is pivoted about a pin or shaft 59 and carries on its upper left end an upwardly directed hook 60. The hook 60 is adapted to engage a notch 61 on a pawl 62 which is pivoted adjacent to notch 61 about a pin 63 secured to an eccentric 64. The eccentric 64 is rotatably mounted on the shaft 11 about which is disposed the ratchet wheel 13. The pawl 63 is normally maintained out of engagement with the ratchet wheel 13 by means of the hook arm 58 but is urged towards engagement with ratchet 13 by means of a spring 65.

Disposed about the eccentric, for slidable motion with respect thereto, is a race 66 having a circular aperture in which the eccentric 64 is disposed. The race 66 has an upwardly directed triangular extension 67 pivoted at its apex by means of pin 68 to the lower apex of a generally triangular rocker arm 69. The rocker arm 69 lies in the same plane as the eccentric 64 and the race 66 and is pivoted at its right apex about a shaft 70 disposed to the right and above the shaft 11. The left hand face of the rocker arm 69 is recessed to provide two generally horizontally extending arms 71 and 72, the arm 72 defining the apex of the rocker arm 69 pivotally secured to the race 66. Secured respectively to the arms 71 and 72 are vertically adjustable screws 73 and 74 having approximately horizontal surfaces engaging the opposite sides of a shaft 75. The shaft 75 is conventional in electric typewriters and is the shaft which is employed to shift the key bed of the typewriter. Disposed in the path of movement of the screw 34 are two switches 128 and 216 which are actuated respectively upon the shaft 75 attaining its uppermost and lowermost positions.

Upon rotation of the shaft 53, due to rotation of the link 30, the arm 54 is rotated counterclockwise thereby shifting the link 55 to the left and rotating the bell crank 56 counterclockwise. Counterclockwise rotation of the link 56 pulls up on the link 57' and rotates the hook arm 58 also counterclockwise, thereby causing the hook 60 of this arm to disengage the notch 61 on the pawl 62. The spring 65 causes the pawl 62 to engage the sprocket wheel 13 and the pawl 62 and the eccentric 64 rotate with the sprocket 13. Rotation of the eccentric 64 causes the race 67 to rise initially and produce clockwise rotation of the rocker arm 69, which raises the shaft 75. The shaft 75 is conventionally secured to the type bar bed and therefore raises the card reading mechanism 21 into the card reading position. Continued rotation of the eccentric 64 thereafter produces downward movement of the race 66 to return the shaft 75 and therefore the reading mechanism 21 to its initial or down position. By the time that the eccentric has returned to the position illustrated in FIGURE 2, the solenoid 22 has released its plunger 23 so that the hooked arm 58 is in the position illustrated in this figure and it picks up the pawl 62 to effect discontinuance of rotation of the eccentric 64.

The essential elements of the shifting and spacing mechanisms thus far described are conventionally provided in electric typewriters. The actuating mechanism for these elements, however, have been modified so that a key shift operation immediately follows a carriage spacing operation.

Figure 5:
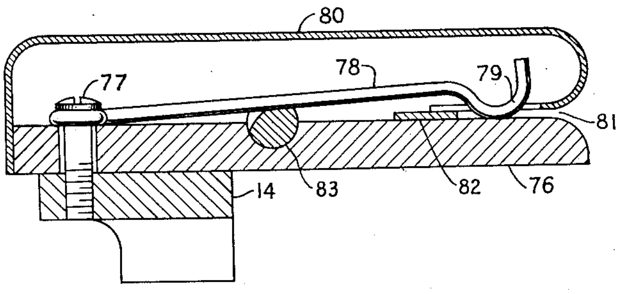
FIGURE 5 is a partial cross section view taken on along line 5—5 of FIGURE 1.

As previously indicated, the carriage 14 of the electric typewriter 1 is modified to hold a punched card which is to be read. Referring specifically to FIGURE 5, a horizontally extending plate 76 is secured to the carriage 14, by means of a bolt 77 under the head of which is clamped a generally horizontally extending spring 78 having a downwardly extending U-shaped end 79. The spring 78 is disposed in a space above the plate 76 defined by the plate 76 and a cover 80 which terminates in a semicircular downwardly extending portion at the right hand side of the plate 76, as used viewed in FIGURE 5. The lower end of the semicircular portion extends parallel to but above the plate 76 to define an opening 81 for receiving the card to be read. The lower parallel portion of the cover 80 extends under the spring 78 and is apertured so that the end 79 of spring 78 may pass therethrough and into contact with the card so as to hold it in position. Disposed in the opening 81 and to the left of the end 79 of the spring 78 is a block 82 which acts as a stop for positioning the card to be read. Disposed below and in contact with the spring 78 is a cam shaft 83 which is actuated by movement of the lever 18.

Upon counter-clockwise rotation of the cam shaft 83, which is effected by rotating the lever 18, the spring is raised and a card may be inserted or removed from the mechanism. Also, rotation of the lever 18 in the clockwise direction rotates the rack gear 16 so that the carriage may be returned to the extreme left hand position. After the carriage has been returned to this position, the lever 18 is rotated counter-clockwise to the extreme left hand position as viewed in FIGURES 2 and 3, to cause the cam shaft 83 to again raise the leaf spring 79 so that a new card may be inserted under the spring after which the lever is returned to its central position by the indexing action of spring 78 and the card is clamped under the spring or springs 78, the stop or block 82 positively positioning the card in the correct position as viewed in FIGURES 1, 5 and 6.

The portion of the card extending outwardly from the opening 81 rests on a card support or plate 84 secured to the top portion of the typewriter immediately above the position of the key bed, as seen in FIGURE 1. The plate 84 has a horizontal slot 85 extending from the front towards the rear of the typewriter 1 immediately above the sensing mechanism 21 for purposes to be explained subsequently. Disposed above the plate 84 immediately over the sensing mechanism 21 is a block 86 under which the card passes, the block 86 preventing upward movement of the card when the sensing mechanism is raised to sense the apertures in the card. The block 86 has a horizontally extending slot 87 coextensive with the slot 85 in the plate 84.

The reading mechanism 21 consists of seven sensing pins 88 mounted for vertical movement in a bearing block 89 having seven apertures 90, one for receiving each of the seven pins 88. The pins 88 are cylindrical members having a section 91 of reduced diameter intermediate the ends of the pins. The upper end of each of the pins 88 terminates in a circular stud 92 of a diameter sufficiently small to pass through apertures 93 in a punched card 94 which is to be sensed by the mechanism. The bearing block 89 is supported on a plate 95 by means of bolts 96. Secured to the bearing block 89 are seven of miniature snap action switches only two of these switches 97 and 153 being illustrated in FIGURE 6. Each of the said switches is disposed adjacent one of the sensing pins 88 and is provided with an arm 98 which supports a roller 99 spring biased into engagement with the vertical sides of the sensing pins 88. Disposed below the sensing pins 88 is a stationary plate 99 which retains seven pin resetting screws 100, each of the screws 100 being disposed vertically below one of the sensing pins 88. The support plate 95 for the sensing mechanism 21 is guided for vertical movement and is suitably secured to the shaft 75 so that upon upward movement of the shaft, the entire sensing mechanism 21 is raised.

Each of the pins 88 is disposed below a distinct area of the card 94 in which information has been recorded in the form of punched or unpunched areas. If, when the sensing mechanism is raised, a pin is aligned with a punched area 93 of the card 94, the upper portion 92 of the pin 88 proceeds through the hole, enters the slot 87 in plate 86 and the pin remains in the position illustrated in FIGURE 6. However, if the card is not apertured, the pin 88 is depressed upon engagement with the card, and the roller 99 moves to the right, as viewed in FIGURE 6, and comes into contact with the portion 91 of reduced diameter of the pin 88. Movement of the arm 98 to the right alters the circuit of the switch 97 for purposes to be described subsequently.

Figure 6:
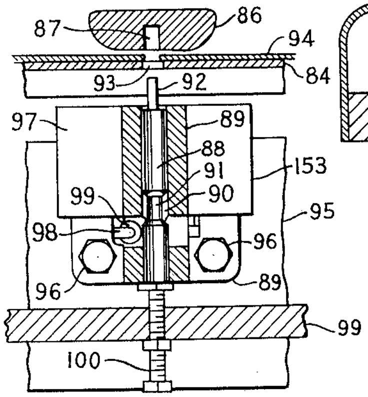
FIGURE 6 is a cross sectional view of the card sensing mechanism taken along line 6—6 of FIGURE 1.

Upon downward movement of the shaft 75, the base or lower portion of the actuated pins 88 engage the upper end of the resetting screws 100 and the pins are returned to the position illustrated in FIGURE 6. Thus, upon each actuation of the solenoid 22, the carriage 14 is moved to the left so as to present a new row of apertures 93 in the card 94 to the sensing mechanism and the sensing mechanism 21 is raised so as to sense the position of the various apertures and to actuate switches in accordance with the pattern of apertures in the card. After the sensing operation, the mechanism 21 is reset upon its downward movement and when the solenoid 22 is again actuated, the carriage is moved to present a further row of holes to the sensing mechanism 21 the sensing mechanism is raised to sense the new row of holes in the card 94 and then returned to have the pins 88 reset. This operation continues so long as desired and as will be described subsequently, if a plurality of wafers of the same configuration are to be fabricated, the carriage is automatically reset to starting position and proceeds to again sense the card.

When it is desired to return the carriage 14 to its extreme right hand position to effect another procession of the card through the reading mechanism, a relay 101 is energized. When the relay 101 is energized, a rod 102 carried by the armature of relay 101 trips an arm 103 which through link 104 and shaft 105 presses a plate 106, secured to shaft 7, into engagement with one face of a pulley 107 which reels in the tape 19 and returns the carriage 14 to its extreme right hand position. As the carriage approaches its extreme right hand position, an arm 20′ on the stop 20 engages a link 108 which through the links 109, 110 and an arm 111 returns shaft 105, the link 104 and members 102, 103 and 104 to their initial position disengaging the ratchet clutch 8. Disposed in the path of the stop 20 is a switch 112 which is closed when the carriage is returned to its extreme right hand position to thereby deenergize the solenoid 101, thereby permitting the clutch actuating mechanism to remain in the position to which it was returned by the linkage 108.

Figure 8:
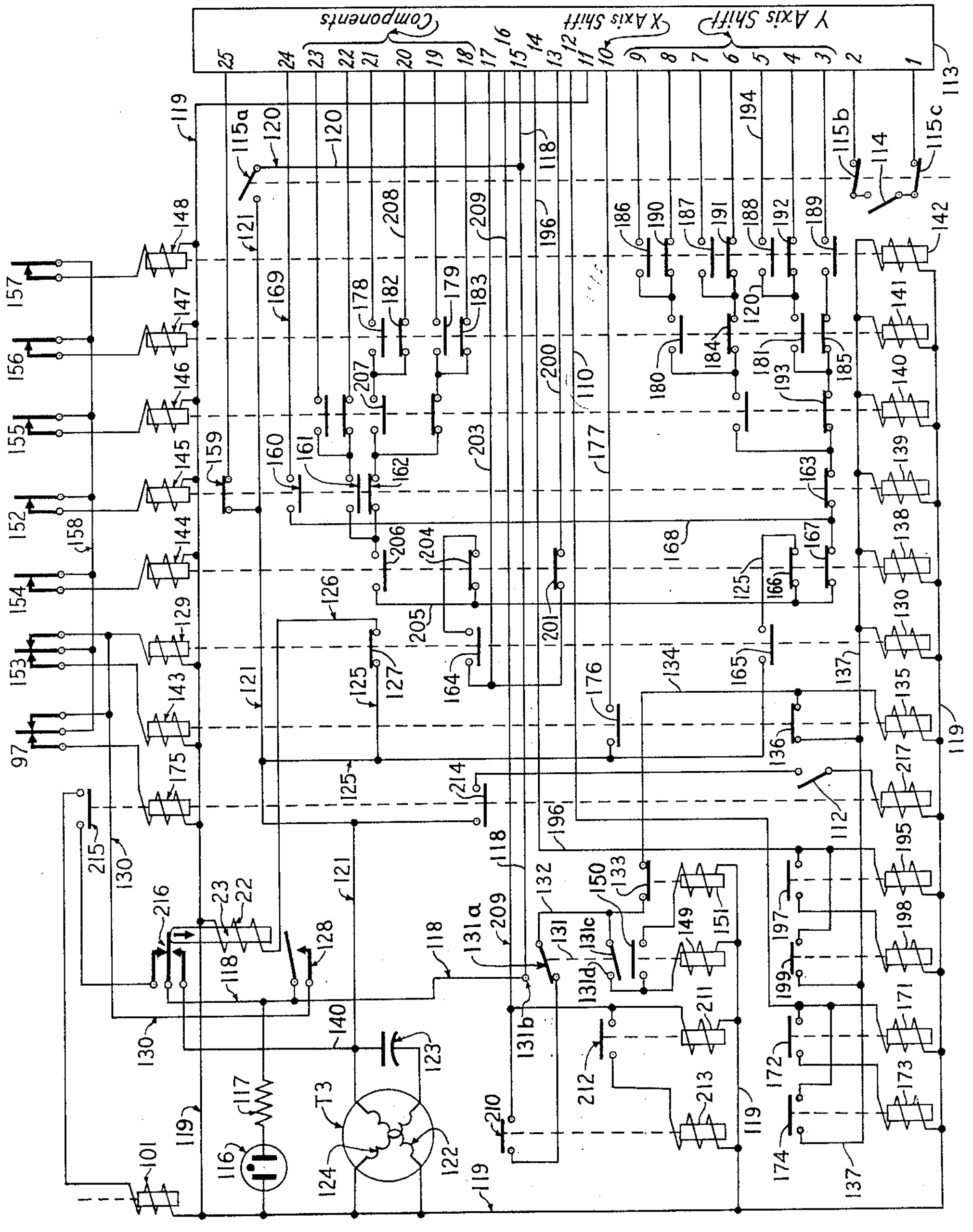
FIGURE 8 is a schematic circuit diagram of the electrical control system of the apparatus of the present invention.

Proceeding now to a description of the circuitry for controlling the various relays discussed above, and for controlling the automatic assembly machine of the aforesaid copending application in accordance with the arrangement of the various holes in the card 94 sensed by the mechanism 21, reference is made to FIGURE 8 of the accompanying drawings which is a circuit diagram of the control circuitry. The electrical control apparatus is provided with a pin connector 113 having a plurality of female pins plugs 1–25 connected over appropriate leads to the block entitled "Card Reader" in FIGURE 38 of the aforesaid copending application of Bernd Vossen. With the card reader appropriately connected to the automatic assembly machine through the connector 113, a main power relay (constituting a part of the automatic assembly machine) may be operated by depressing a push button switch 114 connected between pins 1 and 2 of the connector 113. Depression of the push button switch 114 is effected to operate the power relay of the associated assembly machine provided that a switch 115 is closed.

The switch 115 has three sets of contacts **115*a*, 115*b*, 115*c*, the contacts 115*b* and 115*c* being connected between the push button switch 114 and the pins 1 and 2 respectively. The third set of contacts 115*a* of the switch 115 are connected in circuit with the electric motor 3 of the electric typewriter 1, the contacts 115*a* being open when the contacts 115*b* and 115*c* are closed. It is desirable for the motor 3 and, therefore, the card reader of the present invention to remain deenergized initially to allow time for the associated assembly machine to adjust itself to initial conditions. The power relay of the associated equipment is self-locking so that once it is turned on, it will remain energized regardless of the fact that the contacts 115*b* and 115*c* of the switch 115 are open when the switch section 115*a* is closed to energize the motor 3**.

When the equipment is turned on by depressing the switch 115, 110 volts A.C. is applied by the assembly machine across the terminals 11 and 15 of the connector 113, the terminal 11 being at A.C. ground and the terminal 15 being designated by the legend A.C. 1 indicating a first source of alternating current. The application of alternating current to terminals 11 and 15 produces ionization of a neon light 116 which is connected in series with a current limiting resistor 117 between a lead 118 extending from the pin 15 of the connector 113 and a lead 119 connected to the pin 11 of connector 113. Upon closing the contacts **115*a*, power is supplied to the motor 3 from the pin 15 via leads 118, 120, switch contact 115*a*, lead 121 through a first field 122 of the motor 3 to the lead 119. A capacitor 123 is connected in series with a second field 124 of the electric motor 3 and the series circuit is connected between the leads 121 and 119, the capacitor 123 providing a properly phased voltage to a shading coil 124 of the motor 3. Simultaneously with the energization of the motor 3, power is applied to the solenoid 22 via leads 118, 120, switch contact 115*a*, lead 121, a lead 125, switch contact 127, lead 126, and through the coil of the solenoid 22 to the lead 119. As previously described, upon energization of the solenoid 22, the carriage 14 of the typewriter 1 is spaced one step and thereafter the reading mechanism 21 is raised into the reading position by the shaft 75. Upon the shaft 75 being raised, the switch 128 is closed, the switch 128 being illustrated in FIGURE 8 as associated with the plunger 23 of solenoid 22 so that reference need be made to only one figure, the plunger 23 and shaft 75 having identical operating intervals and, therefore, the timing of the apparatus is preserved. Upon closing of the switch 128, power is applied to the coil of a relay 129 via lead 118, switch 128, lead 130, a coil of relay 129 to the lead 119. Energization of the relay 129 opens switch 127 thereby breaking the circuit of the coil of relay 22** and deenergizing this relay.

The relay 129 is a self-latching relay which remains with its plunger or armature in the raised position until a further relay 130 is energized to return the plunger of the relay 129 to the position indicated in FIGURE 8. Upon deenergization of the solenoid 22, the shift and carriage spacing mechanisms reset and only one revolution of the eccentric 64 takes place. Thus, the carriage was advanced one step and the reading mechanism underwent a single operation. If no card was in the card reading mechanism 21, the apparatus thereafter remains inoperative since further operation of the mechanism cannot take place so long as the switch 127 remains open.

Assuming now that a card is inserted in the card reading mechanism, and the assembly machine is ready to perform a sequence of operations, initially a carriage advance push button 131 is depressed to initiate an automatic sequencing of the equipment. Upon depressing the switch 131, a contact **131–*a* of the switch is closed against a contact 131–*b*, electrically connected to the lead 118. Power is then applied via lead 118, switch contacts 131–*a* and *b*, lead 132, solenoid switch contact 133, lead 134 and through the coil of a solenoid 135. The lead 134 is further connected through a switch contact 136 to a lead 137. Connected between the lead 137 and the lead 119 are a plurality of solenoids 130 and 138 through 142**.

Energization of the relay 130 resets the solenoid 129 and closes the switch contact 127. Upon closing the contact 127, the solenoid 22 is again actuated and an advance and read operation is performed by the card reading mechanism. The reset solenoids 135 and 138 through 142 are associated with relays 143, 144, 145, 147 and 148 respectively to reset the latter relays when they are energized in response to the sensing of appropriate apertures in the card to be read. Upon the switch 131 being closed, a further switch contact 131–*c* is made to engage a stationary contact of the switch 131–*d* and power is applied from the lead 118, switch contacts 131–*b*, 131–*a*, lead 132, switch contact 131–*c* and 131–*d*, through the coil of a relay 149, to the lead 119. Energization of the relay 149 causes switch contacts 150 to be closed to complete thereby a circuit from the lead 132 through the switch contacts 131–*c* and 131–*d*, through the contacts 150 and through the coil of a relay 151 to the lead 119. Energization of the relay 151 opens its associated contacts 133 thereby breaking the power connection to the relays 130 and 135 through 142. The two relays 149 and 151 operate sequentially and define a time interval between closing switch 131 and opening switch 133, equal to approximately twice the time interval required to reset the relays 129 and 143 through 148, the additional time providing a margin of safety.

Returning to the first advance and read cycle initiated upon the closure of the switch 131, the first row of seven possible holes in the punched card 94 normally calls for a wafer transfer operation in the automatic assembly machine; that is, the first row of holes directs the automatic machine to insert a wafer into the wafer positioning mechanism. This operation is accomplished in accordance with the present invention by providing a single hole in the card which permits a single switch 152 to remain closed and alters the position of the remaining sensing switches 97, 153, 154, 155, 156 and 157. The switches 152 through 157 are actuated by the various sensing pins 88 in the same manner as the switch 97 is actuated as previously described. When the plunger 23 of the solenoid 22 is in its retracted position, thus producing a sensing operation, and the switch 128 is closed, power is not only applied to the relay 129 over the lead 130, but is also applied via the contacts of the switch 97 to a lead 158. Since the switches 154 through 157 are open, their associated relays 144 and 146 through 148 remain de-energized. However, the switch 152 remains closed as illustrated in FIGURE 8 of the accompanying drawings and the relay 154 is energized and alters the position of the switches 159, 160, 161, 162 and 163, closing only the switches 160 and 161.

As previously indicated, the relay 129 is also energized opening its associated switch 127 and closing its associated switches 164 and 165. A circuit is now completed from the A.C. lead 118, lead 120, motor switch 115–*a*, leads 121 and 125, switch 165, switches 166 and 167 associated with the relay 144, lead 168, switch 160 and lead 169 to the wafer transfer pin 24 of the connector 113. The A.C. voltage appearing at the pin 24 causes the automatic assembly machine to insert a wafer in the assembly mechanism. In the aforesaid co-pending application, wafer insertion is accomplished by means of a holding solenoid which upon energization inserts a wafer and remains in the wafer insertion position until positively reset by subsequent application of a further control voltage.

When the wafer transfer has been completed by the automatic assembly mechanism, an A.C. voltage appears across the pins 11 and 12 of the connector 113. The A.C. voltage appearing at the pin 12 is applied over a lead 170 through the coil of a relay 171 to the A.C. ground lead 119 thereby energizing the relay 171. Upon energization, relay 171 closes its associated switch 172 and conducts A.C. voltage from the lead 170 through the coil of a relay 173 to the ground return lead 119. Relay 173, upon being energized, closes its associated switch 172 and applies the voltage appearing on the lead 170 to the lead 137 thereby energizing the reset solenoids 130 and 135 through 142 to reset the solenoids 129 and 143 through 148. Resetting of the latter relays closes the switch contact 159 and 127, closing of contacts 159 causing the voltage on lead 121 to be applied to terminal 25 of the connector 113. The voltage appearing at the terminal 25 resets the wafer insertion solenoid. The closure of contacts 127 energizes the solenoid 22 and initiates the next advance and read cycle.

The next set of holes in the cards normally directs the positioning of the wafer into one of fourteen discrete positions, a choice of two positions in one coordinate axis of the wafer and a choice of seven positions in the other coordinate axis of the wafer designated for purposes of illustration as the X and Y axes respectively. It is assumed for the purpose of explanation that the wafer is to be placed in position two in its first coordinate or X axis, which involves a shift of the wafer holding mechanism of the automatic assembly machine, and is to be placed in position three in its other coordinate or Y axis. To effect this positioning of the wafer, holes appear in the card 94 which enable sensing switches 153, 156 and 157 to remain in the position illustrated in FIGURE 8 and the remaining switches 97, 154, 152 and 155 have their positions changed, the sensing switch 153 determining the X axis shift. During the top of the reading cycle, that is, when the sensing pins have either entered holes in the card 94 or been depressed by the lack of holes in the card, and the plunger 23 of the relay 22 is in the down position closing switch 128, a circuit is completed from the lead 118 via switch 128, lead 130, switch 97, lead 158, switch 153 through the coil of relay 143 to the A.C. ground return lead 119.

Upon energization, the relay 143 closes its associated switch 176 and opens its associated switch 136. A circuit is now closed from the lead 118 via lead 120, switch 115–*a*, lead 121, lead 125, switch 176 via lead 177 to the pin 10 of the connector 13 designated X-Axis Shift, the voltage appearing at the pin 10 directing the automatic assembly machine to perform the desired shift of the wafer in its first coordinate axis. In addition to energization of the relay 143, the relays 147 and 148 are also energized due to the fact that the switches 156 and 157 remain closed. Energization of the relay 147 closes its associated switches 178, 179, 180, 181 and opens its associated switches 182, 183, 184 and 185. Energization of the relay 148 closes its associated switches 186, 187, 188 and 189 and opens its associated switches 190, 191 and 192. A circuit which enables the automatic assembly machine to properly position the wafer in the third position of the Y-axis is completed from the lead 118, lead 120, switch 115–*a*, lead 121, lead 125, switch 165, switches 166 and 167, switch 163, a switch 193 associated with relay 146, switches 181 and 188 and via the lead 194 to the pin 5 of the connector 113.

When the automatic assembly machine has completed its positioning cycle a voltage appears across the pins 11 and 14 of the connector 113 and energizes a relay 195 via a lead 196 through the coil of the relay 195 to the A.C. ground return lead 119. Upon energization, the relay 195 closes its associated switch 197, there applying a voltage to the coil of the relay 198 through the switch 197. Upon energization of the lead 196, voltage is applied through the contact 199 of the relay 198 to the lead 137, thereby energizing the relays 130 and 138 through 142 to reset the relays 165, 129 and 145 through 148. The relay 135 is not reset since the switch 103 connected in its energization circuit has previously been opened by energization of the relay 143. In consequence, the switch 176 remains closed and continues to apply an A.C. voltage over lead 177 to the pin 10 of the connector 113 to thereby maintain the wafer in position 2 of the X-axis. This is required since the mechanism for shifting the wafer in the X-axis is biased to the first position and to maintain it in the second position, the mechanism must be maintained energized.

Returning to the relays 195 and 198, upon energization of the relay 198 its associated switch 199 is opened and the resetting voltage is removed from the lead 137. All of the aforesaid operations connected with positioning of the wafer occur during the interval required for the shift and reading mechanisms to accomplish one cycle of operation. Upon resetting of the relay 129 as a result of energization of the relay 130, the switch 127 is again closed thereby effecting energization of the solenoid 22 and initiating another advance and read cycle. The next set of holes in the card 94 to be sensed by the reading mechanism usually contains the information relating to the component to be selected and inserted in the wafer by the automatic assembly machine. Assuming that it is desired to insert a component designated C or more correctly, a component situated in a hopper C of the automatic assembly mechanism, holes are punched in the card 94 so that the switches 154, 155 sense a hole and, therefore, do not have their positions altered, the switch 154 sensing a hole every time a component is to be inserted regardless of the component. A capacitor which forms a part of the automatic assembly machine circuitry, is charged through a resistor and, subsequently, is discharged through the control mechanism for the selected hopper to effect dispensing of a component. The capacitor is charged from the pin 13 of the connector 113 via a lead 200, a switch 201 associated with the solenoid 144, via a lead 202 and lead 203, to the pin 17 of the connector 113, the pin 13 being connected to a positive source of direct current, and the pin 17 being connected to the capacitor circuit.

It will be noted that the capacitor connected to the pin 17 is connected to the pin 13 as soon as the relays are reset after each cycle of operation so that prior to the next reading cycle the capacitor is completely charged. During the reading cycle in which a component is to be selected, energization of the relay 129 effects closure of the switch 164 and a circuit is completed from the pin 17 and via lead 203, switch 164, switch 204 associated with the solenoid 144, a lead 205, a further switch 206 associated with the solenoid 144 and through switches 162, a switch 207 associated with solenoid 146, the switch 182 and a lead 208 connected to the pin 20 of the connector 113, which pin is connected to the mechanism for activating the hopper C.

At the completion of the component insertion, an A.C. voltage is applied across pins 16 and 11 of the connector 113 and voltage is applied to the relay 135 via a series circuit comprising a lead 209, switch 210 associated with relay 213, contacts 131–*e* and 131–*a* of the switch 131, lead 132, switch 133, lead 134 and the coil of the relay 135 to the A.C. ground return lead 119 connected to the pin 11 of the connector 113. Energization of the relay 135 resets the relay 143 which closes its associated contact 136 thereby applying voltage from the lead 134 through the contact 136 to the lead 137 and effecting resetting all of the solenoids 130 and 138 through 142. The application of voltage to the lead 209 also applies a voltage through the coil of a solenoid 211 having the other end of the coil connected to the lead 119. Energization of the relay 211 closes its associated switch 212 to energize the relay 213 which opens its associated switch 210 and breaks the circuit to the reset relays.

It should be noted that upon energization of the relay 135 and resetting of the relay 143 a switch 176 is opened and removes the voltage previously applied to the pin 10 of the connector 13 which is intended to actuate the mechanism for shifting the wafer in the X-axis. When all of the rows of holes of the card 94 have been sensed, it is required that the apparatus of the present invention reset the carriage 14 of the machine 1 so that the card may be again passed through the sensing and reading mechanism to control the fabrication of further additional wafers.

In order to effect return of the carriage 14 the last row of holes to be sensed is provided with a hole opposite the sensing pin 88 which controls actuation of the switch 97, this being the only time when the switch 97 is unactuated and remains in the position illustrated in FIGURE 8. With the switch 97 unactuated, a circuit is completed to a relay 175 upon closure of switch 128, the relay 175 closing its associated switches 214 and 215. Disposed in the path of movement of the screw 74 of the rocker arm 69 is a single pole-double pole switch 216, which when the shaft 75 is in its upper position establishes a parallel circuit to the motor 3. The parallel circuit to the motor 3 is established to insure that each cycle of operation is completed regardless of the fact that the switch 115–*a* may be opened, so that the pins 88 of the sensing mechanism 21 are withdrawn from the holes of the card before a carriage return or carriage advance operation is effected. The switch 216, when the shaft 75 is raised, also opens the circuit to the carriage return relay 101 so as to prevent carriage return until after the sensing pins 88 of the sensing mechanism 21 have been withdrawn from the card, even though the circuit to relay 101 is otherwise completed by operation of the relay 175. When the solenoid 22 is deenergized due to opening of the switch 127, and the switch 216 is closed in its upper position, as viewed in FIGURE 8, a circuit is completed from the A.C. lead 118 through the upper contact of the switch 216 through the switch 215 and through the coil of the carriage return relay 101 to the A.C. ground return lead 119.

Upon energization of the solenoid 101, the carriage 14 is returned as previously described and the switch 112 is closed. Upon closure of the switch 112, a relay 217 is energized and resets the relay 175 and opens the switches 214 and 215. Opening of the switch 215 deenergized the solenoid 101 and opening of the switch 214 deenergizes the resetting solenoid 217.

The last operation indicated by the holes in a punched card 94 will normally be a component selection and carriage return function and upon completion of component insertion which takes place at some time after carriage return, a voltage is applied to the pin 16 of connector 113 to reset the relays 130, 135 and 138 through 142, thereby closing the switch 127 and initiating a new advance and read cycle. The machine continues to sequence itself automatically until the end of the card is again obtained at which time another carriage return operation is effected. Therefore, the machine automatically sequences itself through any number of card reading cycles so long as a hole is provided at the end of each cycle opposite the pin 88 associated with switch 97. If no hole is provided, the reader proceeds through another advance and read cycle and sensing no card, the control apparatus is disabled since a reset voltage is not generated by the assembly mechanism and the switch 127 remains open.

It is apparent from the above that the card reading mechanism of the present invention employs the available elements of an electric typewriter such as the carriage spacing and return mechanisms and the shift mechanisms, it being necessary only to interrelate the spacing and shift mechanisms and to provide a solenoid to actuate these mechanisms. The only substantial modification of the typewriter is the replacement of the type bar assembly with the sensing mechanism 21 and the removal of the keys. The specific mechanical linkages employed for interrelating the shift and spacing mechanisms will vary with the type of electric typewriter utilized as will the additional components required to effect actuation of these various mechanisms. Regardless of the type of electric typewriter employed, the apparatus of the present invention allows a standard electric typewriter to be modified with a minimum of time and effort to effect sequential and repetitive reading of punched cards for the control of an automatic assembly machine of the type described in the aforesaid co-pending application of Bernd Vossen or other types of mechanical or electrical systems.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. In a punched member reading mechanism employing an electric machine having a carriage, a carriage advance mechanism, a carriage return mechanism, a shift mechanism having a first and second position and a source of power for operating said mechanisms, the combination of a punched member holder secured to said carriage, a punched member sensing mechanism secured to and movable with said shift mechanism from an inactive position to a punched member sensing position upon movement of said shift mechanism from said first to said second position, means for normally retaining said shift mechanism in said first position, means for selectively coupling said carriage advance mechanism to said source of power to effect an advance of said carriage and means interrelating said carriage advance mechanism and said shift mechanism to effect movement of said shift mechanism from said first position to said second position in response to completion of each advance of said carriage.

2. In a punched member reading mechanism employing an electric machine having a carriage, a carriage advance mechanism, a carriage return mechanism, a shift mechanism movable between a first and a second position and a source of power for operating said mechanisms, the combination of a punched member holder secured to and movable with said carriage, a punched member sensing mechanism secured to and movable with said shift mechanism from an inactive position to a sensing position upon movement of said shift mechanism from said first to said second position, means for normally retaining said shift mechanism in said first position, means for selectively coupling said carriage advance mechanism to said source of power to effect advance of said carriage and mechanical means interrelating said carriage advance mechanism and said shift mechanism to effect movement of said shift mechanism from said first to said second to said first position in response to completion of each advance of said carriage.

3. In a mechanism for reading punched members bearing information determined by the apertured or unapertured condition of a plurality of discrete information areas arranged in rows and columns on the punched member and employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive position to a punched member sensing position upon movement of said shift mechanism from said first to said second position, means for normally retaining said shift mechanism in said first position, means interrelating said carriage advance mechanism and said shift mechanism to effect movement of said shift mechanism from said first to said second position upon completion of each advance of said carriage, means for selectively coupling said carriage advance mechanism to said source of power to effect an advance of said carriage, relay means for actuating said carriage return mechanism upon energization of said relay means, and means for energizing said relay means upon said sensing mechanism detecting a predetermined condition of one of said discrete areas in one of said rows.

4. In a mechanism for reading punched members bearing information determined by the apertured or unapertured condition of a plurality of discrete information areas arranged in rows and columns on the member and employing an electric machine having a carriage, a carriage advance mechanism, a carriage return mechanism, a shift mechanism having a first and a second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, said sensing mechanism having means for sensing the conditions of all of the discrete areas in a single column simultaneously, means for normally retaining said shift mechanism in said first position, means for selectively and intermittently coupling said carriage advance mechanism to said source of power to present sequentially the distinct columns of the punched member to said sensing mechanism and means interrelating said carriage advance mechanism and said shift mechanism to effect movement of said shift mechanism from said first position to said second position in response to completion of each advance of said carriage.

5. In a punched member reading mechanism employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, means for normally retaining said shift mechanism in said first position, means for selectively coupling said carriage advance mechanism to said source of power to effect an advance of said carriage, means interrelating said carriage advance mechanism and said shift mechanism to effect movement of said shift mechanism from said first position to said second position upon completion of each advance of said carriage, said means for selectively coupling including a relay energizable for actuating said means for coupling, an energizing circuit for said relay, means for initially closing said energization circuit to initiate a first advance of said carriage and a first operation of said shift mechanism, means for opening said energization circuit each time said shift mechanism obtains said second position and means for selectively reclosing said energization circuit.

6. In a punched member reading mechanism employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, means for normally retaining said shift mechanism in said first position, means for selectively coupling said carriage advance mechanism to said source of power to effect an advance of said carriage, means interrelating said carriage advance mechanism and said shift mechanism to effect movement of said shift mechanism from said first position to said second position upon completion of each advance of said carriage, said means for selectively coupling including a relay energizable for actuating said means for coupling, an energizing circuit for said relay, means for initially closing said energization circuit to initiate a first advance of said carriage and a first operation of said shift mechanism, means for opening said energization circuit each time said shift mechanism obtains said second position, selectively actuatable means for reclosing said energization circuit, at least one input lead to said means for reclosing, and means responsive to the application of an electric signal to said lead to actuate said means for reclosing.

7. In a mechanism for reading punched members bearing information determined by the apertured or unapertured condition of a plurality of discrete information areas arranged in rows and columns on the member and employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, said sensing mechanism having means for sensing the conditions of all of the discrete areas in a single column simultaneously, means for normally retaining said shift mechanism in said first position, means for selectively and intermittently coupling said carriage advance mechanism to said source of power to present sequentially the distinct columns of the punched member to said sensing mechanism, means interrelating said carriage advance mechanism and said shift mechanism to effect movement of said shift mechanism from said first position to said second position in response to completion of each advance of said carriage, a relay for coupling said carriage return mechanism to said source of power when said relay is energized, a normally open energizing circuit for said relay, means responsive to said sensing mechanism detecting a predetermined condition of a discrete area in a predetermined one of said rows for closing said energizing circuit and switch means responsive to return of said carriage for opening said energizing circuit.

8. In a mechanism for reading punched members bearing information determined by the apertured or unapertured condition of a plurality of discrete information areas arranged in rows and columns on the member and employing an electric machine having a carriage, a carriage advance mechanism and a shift mechanism movable between a first position and a second position, the combination of a punched member holder secured to said carriage, a punched member sensing mechanism including block means secured to said shift mechanism and movable between an inactive and an active position upon movement of said shift mechanism from said first to said second position, means for normally retaining said shift mechanism in said first position, a plurality of elongated sensing pins, means for frictionally receiving said pins in said block means for movement between and retention in one position and another position, means for initially positioning said pins in said one position, said punched member holder positioning a punched member at a predetermined distance above said pins, means for selectively coupling said carriage advance mechanism to said source of power to effect an advance of said carriage such that each discrete area of a column of discrete areas of the punched member is aligned with a different sensing pin, means interrelating said carriage advance mechanism and said shift mechanism to effect movement of said shift mechanism from said first position to said second position upon completion of each advance of said carriage, said shift mechanism moving said block means to said active position through a distance greater than the distance between said pins and the punched member, the pins aligned with an unapertured discrete area of the punched member contacting the punched member and being moved to said other position, means for resetting all of said pins to said one position upon return of said shift mechanism to said first position, a plurality of switch means each associated with a different sensing pin, each of said switch means selectively positionable in a first circuit condition and in a second circuit condition and means for positioning each of said switch means in said first circuit condition and in said second circuit condition respectively upon its associated sensing pin obtaining said one position and said other position.

9. In a mechanism for reading punched members bearing information determined by the apertured or unapertured condition of a plurality of discrete information areas arranged in rows and columns on the member and employing an electric machine having a carriage, a carriage advance mechanism and a shift mechanism movable between a first position and a second position, the combination of a punched member holder secured to said carriage, a punched member sensing mechanism including block means secured to said shift mechanism and movable between an inactive and an active position upon movement of said shift mechanism from said first to said second position, means for normally retaining said shift mechanism in said first position, a plurality of elongated sensing pins, means for frictionally receiving said pins in said block means for movement between and retention in one position and another position, means for initially positioning said pins in said one position, said punched member holder positioning a punched member at a predetermined distance above said pins, means for selectively coupling said carriage advance mechanism to said source of power to effect an advance of said carriage such that each discrete area of a column of discrete areas of the punched member is aligned with a different pin, means interrelating said carriage advance mechanism and said shift mechanism to effect movement of said shift mechanism from said first position to said second position upon completion of advance of said carriage, said shift mechanism moving said block means to said active position through a distance greater than the distance between said pins and the punched member, the pins aligned with an unapertured discrete area of the punched member contacting the punched member and being moved to said other position, means for resetting all of said pins to said one position upon return of said shift mechanism to said first position, a plurality of switch means each associated with a different sensing pin, each of said switch means selectively positionable in a first circuit condition and in a second circuit condition and means for positioning each of said switch means in said first circuit condition and in said second circuit condition respectively upon its associated sensing pin obtaining said one position and said other position, a plurality of output leads and relay means responsive to the positions of said switch means for selectively applying a signal to at least one of said output leads.

10. In a mechanism for reading punched members bearing information determined by the apertured or unapertured condition of a plurality of discrete information areas arranged in rows and columns on the member and employing an electric machine having a carriage, a carriage advance mechanism and shift mechanism movable between a first position and a second position, the combination of a punched member holder secured to said carriage, a punched member sensing mechanism including block means secured to said shift mechanism and movable between an inactive and an active position upon movement of said shift mechanism from said first to said second position, means for normally retaining said shift mechanism in said first position, a plurality of elongated sensing pins, means for frictionally receiving said pins in said block means for movement between one position and another position, means for initially positioning said pins in said one position, said punched member holder positioning a punch member at a predetermined distance above said pins, means for selectively coupling said carriage advance mechanism to said source of power to effect an advance of said carriage such that each discrete area of a column of discrete areas of the punched member is aligned with a different pin, means interrelating said carriage advance mechanism and said shift mechanism to effect movement of said shift mechanism from said first position to said second position in response to completion of advance of said carriage, said shift mechanism moving said block means to said active position through a distance greater than the distance between said pins and the punched member, the pins aligned with an unapertured discrete area of the punched member contacting the punched member and being moved to said other position, means for resetting all of said pins to said one position upon return of said shift mechanism to said first position, a plurality of switch means each associated with a different sensing pin, each of said switch means associated with a different sensing pin and selectively positionably in a first circuit condition and in a second circuit condition and means for positioning each of said switch means in said first circuit condition and in said second circuit condition respectively upon its associated sensing pin obtaining said one position and said other position, said means for selectively coupling including a relay energizable to actuate said means for coupling, an energizing circuit for said relay, means for initially closing said energization circuit to initiate advance of said carriage and operation of said shift mechanism, switching means responsive to said shift mechanism attaining said second position for opening said energizing circuit and selectively actuable means for reclosing said energizing circuit and means for preventing actuation of said means for reclosing upon all of said switch means remaining in said one position upon movement of said sensing mechanism to said active position.

11. In a punched member reading mechanism employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, means for normally retaining said shift mechanism in said first position, means for selectively coupling said carriage advance mechanism to said source of power to effect an advance of said carriage, means interrelating said carriage advance mechnism and said shift mechanism to effect movement of said shift mechanism from said first position to said second position upon completion of advance of said carriage, said means for selectively coupling including a first relay means energizable for actuating said means for coupling, an energizing circuit for said relay, means for initially closing said energization circuit to initiate advance of said carriage and operation of said shift mechanism, second relay means having one and another stable position, said second relay means being normally in said one position and movable to said other position upon energization, an actuating circuit for said second relay means, a normally open switch disposed in said actuating circuit, means for closing said switch upon said shift mechanism obtaining said second position, a switch means disposed in said energizing circuit for said first relay means, means for opening said switch means upon energization of said second relay means and selectively energizable third relay means for returning said second relay means to said one position.

12. In a mechanism for reading punched members bearing information determined by the apertured or unapertured condition of a plurality of discrete information areas arranged in rows and columns on the member and employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism, secured to and movable with said shift mechanism from an inactive to a punched member sensing position upon movement of said shift mechanism from said first to said second position, means for normally retaining said shift mechanism in said first position, means interrelating said carriage advance mechanism and said shift mechanism to effect movement of said shift mechanism from said first to said second position upon completion of advance of said carriage, means for selectively coupling said carriage advance mechanism to said source of power to effect an advance of said carriage, first relay means for actuating said carriage return mechanism, said coupling mechanism including a second relay means for actuating said coupling mechanism, a plurality of output leads, a first plurality of relay means having two stable positions, a second plurality of relay means having two stable positions, means responsive to the condition of the discrete areas of the punched member as determind by said sensing mechanism for selectively actuating various relay means of said first plurality of relay means, means rseponsive to actuation of a first predetermined pattern of various relays of said first plurality of relay means to one of said stable positions for selectively energizing said first relay means, means responsive to actuation of further predetermined patterns of various relays of said first plurality of relay means to said one of said stable positions for applying signals to various ones of said output leads, and means for selectively actuating various relay means of said second plurality to return said relay means of said first plurality to the other of said stable positions.

13. In a punched member reading mechanism employing an electric machine having a carriage, a carriage advance mechanism, a carriage return mechanism, a shift mechanism, having a first and second position and a source of power for operating said mechanisms, the combination of a punched member holder secured to said carriage, a punched member sensing mechanism secured to and movable with said shift mechanism from an inactive to a punched member sensing position upon movement of said shift mechanism from said first to said second position, means for normally retaining said shift mechanism in said first position, means for selectively coupling said carriage advance mechanism to said source of power to effect an advance of said carriage, means interrelating said carriage advance mechanism and said shift mechanism to effect movement of said shift mechanism from said first position to said second position in response to completion of each advance of said carriage and means responsive to said shift mechanism attaining said second position for disabling said means for selectively coupling.

14. In a mechanism for reading punched members bearing information determined by the apertured or unapertured condition of a plurality of discrete information areas arranged in rows and columns on the member and employing an electric machine having a carriage, a carriage advance mechanism and a shift mechanism movable between a first position and a second position, the combination of a punched member holder secured to said carriage, a punched member sensing mechanism including block means secured to said shift mechanism and movable between and inactive and an active position upon movement of said shift mechanism from said first to said second position, means for normally retaining said shift mechanism in said first position, a plurality of elongated sensing pins, means for frictionally receiving said pins in said block means for movement between and retention in one position and another position, means for initially positioning said pins in said one position, said punched member holder positioning a punched member at a predetermined distance above said pins, means for selectively coupling said carriage advance mechanism to said source of power to effect an advance of said carriage such that each discrete area of a column of discrete areas of the punched member is aligned with a different pin, means interrelating said carriage advance mechanism and said shift mechanism to effect movement of said shift mechanism from said first position to said second position in response to completion of each advance of said carriage, said shift mechanism moving said block means to said active position through a distance greater than the distance between said pins and the punched member, the pins aligned with an unapertured discrete area of the punched member contacting the punched member and being moved to said other position, means for resetting all of said pins to said one position upon return of said shift mechanism to said first position, a plurality of switch means each associated with a different sensing pin, each of said switch means selectively positionable in a first circuit condition and in a second circuit condition and means for positioning each of said switch means in said first circuit condition and in said second condition respectively upon its associated sensing pin obtaining said one position and said other position, said means for selectively coupling including a relay energizable to actuate said means for coupling, an energizing circuit for said relay, means for initially closing said energization circuit to initiate advance of said carriage and operation of said shift mechanism, switching means responsive to said shift mechanism attaining said second position for opening said energizing circuit and means for reclosing said energizing circuit.

15. A perforated card reading mechanism for controlling a machine comprising an electric machine having a carriage, a carriage advance mechanism, a carriage return mechanism, a shift mechanism, having a first and second position, a source of power for operating said mechanisms, a punched member holder secured to said carriage, a punched member sensing mechanism secured to and movable with said shift mechanism from an inactive to a punched member sensing position upon movement of said shift mechanism from said first to said second position, a plurality of output leads, means for developing patterns of output voltages on said output leads in accordance with a pattern of perforations in said card, the various patterns of voltages representing different functions to be performed by the machine, at least one input lead, a voltage being developed on said input lead upon the machine performing the functions defined by the patterns of voltages on said output leads, means for normally retaining said shift mechanism in said first position, means for selectively coupling said carriage advance mechanism and said shift mechanism to effect movement of said shift mechanism from said first position to said second position upon completion of each advance of said carriage, said means for selectively coupling including a relay energizable for actuating said means for coupling, an energizing circuit for said relay, means for initially closing said energization circuit to initiate a first advance of said carriage and a first operation of said shift mechanism, means for opening said energization circuit each time said shift mechanism obtains said second position and means responsive to a voltage on said input lead for selectively reclosing said energization circuit.

16. In a punched member reading mechanism employing an electric machine having a carriage, a carriage advance mechanism, a carriage return mechanism, a shift mechanism having a first and second position and a source of power for operating said mechanisms, the combination of a punched member holder secured to said carriage, a punched member sensing mechanism secured to and movable with said shift mechanism from an inactive position to a punched member sensing position upon movement of said shift mechanism from said first to said second position, means for normally retaining said shift mechanism in said first position, means for selectively coupling said carriage advance mechanism to said source of power to effect an advance of said carriage and means responsive to the completion of each advance of said carriage to couple said shift mechanism to said source of power to effect movement of said shift mechanism from said first position to said second position.

17. In a punched member reading mechanism employing an electric machine having a carriage, a carriage advance mechanism, a carriage return mechanism, a shift mechanism having a first and second position and a source of power for operating said mechanisms, the combination of a punched member holder secured to said carriage, a punched member sensing mechanism secured to and movable with said shift mechanism from an inactive position to a punched member sensing position upon movement of said shift mechanism from said first to said second position, means for normally retaining said shift mechanism in said first position, means for selectively coupling said carriage advance mechanism to said source of power to effect an advance of said carriage intermittently actuated means for selectively coupling said shift mechanism to said source of power to effect movement of said shift mechanism from said first position to said second position, and means for actuating said intermittently actuated means only in response to completion of advance of said carriage.

18. In a mechanism for reading punched members bearing units of information determined by the apertured or unapertured condition of a plurality of discrete information areas arranged in rows and columns on the member and employing an electric machine having a carriage, a carriage advance mechanism and a shift mechanism movable between a first position and a second position, the combination of a punched member holder secured to said carriage, a punched member sensing mechanism for sensing the apertured and unapertured condition of each information area in a column of said punched members upon movement of said shift mechanism from said first to said second position, means for normally retaining said shift mechanism in said first position, means for selectively coupling said carriage advance mechanism to said source of power to effect movement of said carriage such that after each movement thereof a different column of discrete areas of said punched member is aligned with said sensing mechanism, means interrelating said carriage advance mechanism and said shift mechanism to effect movement of said shift mechanism from said first position to said second position in response to completion of advance of said carriage, said means for selectively coupling including a relay energizable to actuate said means for coupling, an energizing circuit for said relay, means for initially closing said energization circuit to initiate advance of said carriage and operation of said shift mechanism, switching means responsive to said shift mechanism attaining said second position for opening said energizing circuit, selectively actuable means for reclosing said energizing circuit and means for preventing actuation of said means for reclosing upon said sensing means detecting a predetermined unit of information in a column of said punched member.

References Cited in the file of this patent

UNITED STATES PATENTS

| | | |
|---|---|---|
| 1,976,618 | Lee et al. | Oct. 9, 1934 |
| 2,290,827 | Thomas | July 21, 1942 |
| 2,464,608 | Rabenda et al. | Mar. 15, 1949 |
| 2,490,360 | Johnson | Dec. 6, 1949 |
| 2,761,624 | Marples et al. | Sept. 4, 1956 |
| 2,818,212 | Oberdorf | Dec. 31, 1957 |
| 2,819,020 | Baer et al. | Jan. 7, 1958 |
| 2,900,066 | Tholstrup | Aug. 18, 1959 |